H. N. COX.
GALVANIC BATTERY.
APPLICATION FILED APR. 12, 1919.

1,390,765.

Patented Sept. 13, 1921.

Witnesses:
H. L. Fisher.
William A. Hardy.

Inventor:
Harold N. Cox
By Delos Holden

UNITED STATES PATENT OFFICE.

HAROLD N. COX, OF GLEN RIDGE, NEW JERSEY, ASSIGNOR TO NEW JERSEY PATENT COMPANY, OF WEST ORANGE, NEW JERSEY, A CORPORATION OF NEW JERSEY.

GALVANIC BATTERY.

1,390,765.   Specification of Letters Patent.   Patented Sept. 13, 1921.

Application filed April 12, 1919. Serial No. 289,645.

*To all whom it may concern:*

Be it known that I, HAROLD N. COX, a citizen of the United States, and a resident of Glen Ridge, Essex county, New Jersey, have invented certain new and useful Improvements in Galvanic Batteries, of which the following is a description.

My invention relates generally to improvements in galvanic batteries, and more particularly to that class of primary batteries in which a negative electrode consisting of an element or elements of oxid of copper or other depolarizing agent, and a positive electrode consisting of an element or elements of zinc are disposed in a caustic alkaline electrolyte.

The principal object of my invention is to provide an improved form of negative electrode, preferably an oxid of copper electrode, for a primary battery cell, whereby, without any increase in the active materials or any change in the relative location of the elements, a more uniform rate of discharge and a greater ampere hour capacity will be obtained when the cell is discharged to a given minimum limiting voltage.

More specifically described, my invention consists in providing a suitable conducting surface or layer within and preferably in the middle of the negative plate or element instead of on the outside thereof as has heretofore been customary, in order that the reduction of the copper oxid, or other depolarizing material of which the element is formed, will progress from within the element or plate outwardly, whereby the resistance of the element to the passage of the ions which travel in the cell between the positive and negative elements will be greatest at the beginning of the discharge of the cell and will constantly decrease, instead of being greatest at the end of the discharge of the cell when the exhaustion of the other active materials in the cell is contributing to the loss in voltage.

A further object of my invention resides in a negative plate or element provided with an inner layer or surface of conducting material such as described above and having a binder, preferably comprising an electrolyte, for the copper oxid or other depolarizing material, whereby the plate or element may be made sufficiently hard and coherent for practical use without subjecting the same to the usual baking operation.

My invention also resides in the method of producing my improved negative electrode.

Other objects and features of my invention will be hereinafter more specifically described and claimed.

For a clearer understanding of my invention, attention is directed to the drawing accompanying and forming a part of this specification, and in which.

Figure 1:
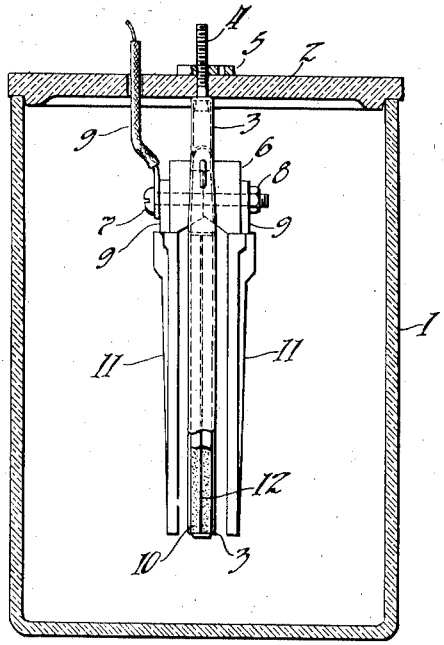
Figure 1 is a central vertical sectional view, partly in elevation, of a primary battery cell provided with my improved negative electrode, taken at right angles to the positive and negative plates.

Referring to the drawing and especially to Fig. 1, reference character 1 represents an ordinary battery jar or container provided with the usual cover 2, both the jar and the cover being preferably formed of glass or porcelain. Reference character 3 represents a hanger or frame supporting the negative oxid of copper plate 10 and preferably formed of a strip of iron or steel plated with copper. The hanger 3 is preferably in the form of an inverted U and is supported from the cover 2 in any suitable manner, as by a bolt or threaded rod 4 connected thereto and passing through the cover, and a nut 5 threaded on the rod above the cover. The positive zinc plates 11, 11 are spaced and insulated from the negative plate 10 and supported from the hanger 3 by means of a split insulating block 6, preferably formed of porcelain, the parts being mechanically secured together by means of a bolt 7 and a nut 8 threaded on the end of the bolt. The bolt 7 extends through apertured lugs 9 provided on the positive plates 11, 11 and serves to electrically connect these plates. The bolt 7 constitutes one terminal of the battery cell and has suitably connected thereto a conductor 9' extending through an opening provided therefor in the cover 2 of the cell container; and the bolt or rod 4 constitutes the other terminal of the cell.

The copper oxid or negative plate 10 is provided with a continuous conducting layer or sheet 12 preferably disposed in the middle of the plate and extending to the outer edge thereof in order to make contact with the conducting supporting frame or hanger 3. This improved negative plate may be made in various forms, two of which are illustrated in Figs. 2 and 3.

Figure 2:
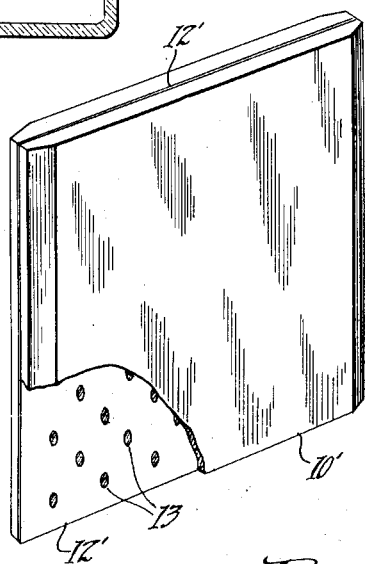
Fig. 2 is an enlarged view in perspective, partly broken away, of one form of negative plate in accordance with my invention.

The negative plate 10' shown in Fig. 2 comprises a compressed hard coherent mass of oxid of copper with a thin metallic conducting sheet 12', preferably of copper, iron, or iron plated with copper, disposed in the middle thereof and preferably perforated as shown at 13. so that the oxid of copper will enter the perforations and thereby prevent separation of the parts of the plate. This form of plate may be made by disposing the sheet 12 in the middle of a mass of finely divided oxid of copper and then compressing the same under enormous pressure to the desired shape in a suitable mold, removing the plate so formed from the mold and then subjecting the same to the usual baking operation in order to agglomerate and harden the oxid of copper. Preferably, however, an electrolyte such, for example, as sodium hydroxid or an ammonium salt, but preferably ammonium chlorid or a mixture of the same either with zinc, metallic iron, iron reduced by hydrogen, or any other metal which will reduce the copper oxid in the presence of an electrolyte or, in other words, which is more electro-positive than copper, is combined with the oxid of copper as a binder in forming the molded element, and the latter is then dried. When this method is followed the baking operation may be omitted, as the molded plates thus produced from oxid of copper combined with such a binder are found to be sufficiently hard and coherent for practical use.

Figure 3:
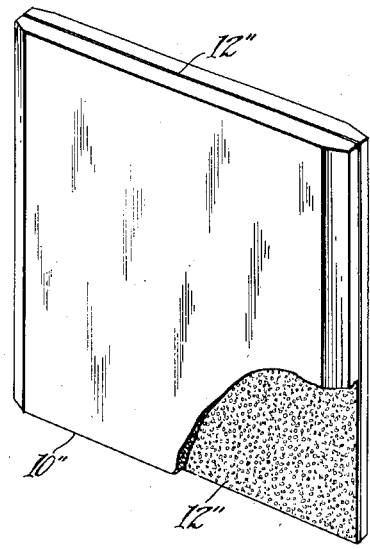
Fig. 3 is a view similar to Fig. 2 of another form of negative plate in accordance with my invention.

In the plate 10" shown in Fig. 3, instead of employing a perforated metallic sheet, as in the form shown in Fig. 2, I provide a continuous layer 12" formed of a powdered metallic conducting material which is more electro-positive than copper, such as zinc or iron. This form of plate may be made by introducing finely divided copper oxid into the mold in which the plate is to be pressed until such mold is half filled, then sifting the powdered metallic material onto the exposed surface of the copper oxid until a continuous surface extending to the edge of the mold is obtained, completing the filling of the mold with the copper oxid, and then compressing the material in the mold under enormous pressure. The molded element is then removed and subjected to the usual baking operation in order to harden and agglomerate the copper oxid. This method, however, is not very satisfactory, as the zinc or the copper which is reduced thereby is very liable to be oxidized during the baking operation. Accordingly, I preferably incorporate a suitable binder, comprising an electrolyte, such as sodium hydroxid or an ammonium salt, but preferably ammonium chlorid, or a mixture of the same and finely divided metallic material which is more electro-positive than copper, such as zinc, iron or iron reduced by hydrogen, with the oxid of copper in forming the molded element, and then dry such element, as described in my copending application Serial No. 289,644, filed April 12, 1919, and entitled Production of electrodes for galvanic batteries. When this method is followed the baking operation is omitted as I find the elements produced to be sufficiently hard and coherent for practical use.

It will be apparent that in a battery cell provided with my improved negative electrode or plate, as shown in Fig. 1, the reduction of the oxid of copper in the plate 10 as the cell discharges will proceed from the middle of the plate 10. namely, from the layer or sheet 12 outwardly of the plate; and therefore the resistance of the plate 10 to the passage of the ions which travel between the positive plates 11, 11 and the negative plate will be greatest when the cell begins to discharge and will constantly decrease as the cell continues to discharge until the negative plate 10 is completely exhausted or reduced. Moreover, the distance the ions travel in electrolyte in passing between the positive plates 11, 11 and the acting surface or layer of the negative electrode will constantly decrease as the cell discharges. Consequently, the increased resistance in the cell due to the exhaustion of the positive plates 11, 11 and the accumulation in the electrolyte between the negative plate and the positive plates of the soluble secondary products of the reaction which takes place when the cell discharges, will be compensated for, at least partially, with the result that the cell will have a more uniform discharge rate and a greater ampere hour capacity in the discharge thereof to a given minimum limiting voltage.

The presence of the conducting surface or layer in the middle of my improved electrode, regardless of which of the various forms thereof is employed, serves to start the discharge when such electrode is set up in a cell. When the form of negative element shown in Fig. 3 is employed, the zinc, iron, or other material more electro-positive than copper of which the layer 12" is formed will, as soon as the cell is assembled, at once be oxidized by reason of the local action between such material and the oxid of copper when disposed in the electrolyte and be replaced by copper which will serve to start the discharge of the cell, and in case this form of element contains a binder for the oxid of copper comprising an electrolyte, this replacement will commence just as soon as the element is produced.

Iron reduced by hydrogen generally consists of a mixture of finely divided pure iron and iron oxid or oxids, and accordingly, the term "iron-containing material" as used in certain of the claims is intended to cover both iron and the oxids thereof.

While I have described the preferred forms of my improved electrode and the preferred methods of making the same, it is to be understood that many changes and modifications may be made therein without departing from the spirit of the invention and the scope of the appended claims.

Having now described my invention, what I claim as new and desire to protect by Letters Patent is as follows:

1. A negative electrode for a galvanic battery comprising an element of depolarizing material having a layer of conducting material more electro-positive than said depolarizing material disposed therein intermediate the surfaces thereof which are adapted to oppose the positive electrodes of the battery, substantially as described.

2. A negative electrode for a galvanic battery, consisting of depolarizing material molded into a plate and having a perforated sheet of conducting material disposed therein intermediate the outer surfaces of the plate, substantially as described.

3. A negative electrode for a galvanic battery, comprising a layer of conducting material and a strong coherent compressed mass of depolarizing material on each side of such layer, substantially as described.

4. A negative electrode for a galvanic battery, comprising a layer of conducting material and a strong coherent compressed mass consisting of a mixture of a finely divided depolarizing material and an electrolyte as a binder therefor disposed on each side of such layer, said conducting material being more electro-positive than said depolarizing material, substantially as described.

5. An oxid of copper plate for a galvanic battery having a layer of metallic material which is more electro-positive than copper disposed therein substantially midway between its outer surfaces, substantially as described.

6. An oxid of copper plate for a galvanic battery having a layer of powdered metallic zinc disposed therein substantially midway between its outer surfaces, substantially as described.

7. A negative electrode for a galvanic battery, consisting of a layer of conducting material more electro-positive than copper and a strong coherent compressed mass comprising a mixture of oxid of copper and a binder therefor comprising an electrolyte disposed on each side of such layer, substantially as described.

8. A negative electrode for use in a primary battery cell, comprising an element formed of depolarizing material and having a conducting layer formed of material more electro-positive than said depolarizing material and so disposed that the reduction of said depolarizing material when the cell is discharged will progress from within the element and intermediate the surfaces of the element which are adapted to oppose the positive electrodes of the cell outwardly, substantially as described.

9. A primary battery cell, comprising a positive electrode and a negative electrode disposed adjacent to and spaced from each other in a suitable electrolyte, the negative electrode comprising a mixture of depolarizing material and an electrolyte, and being provided with a layer of conducting material more electro-positive than said depolarizing material, said layer being so disposed that as the cell is discharged the distance the ions passing between the positive and negative electrodes travel in electrolyte constantly decreases, substantially as described.

10. The method of forming an electrode for a galvanic battery, which consists in disposing finely divided depolarizing material on each side of a layer of conducting material and then subjecting the same to a high molding pressure in a suitable die, substantially as described.

11. The method of forming an electrode for a galvanic battery, which consists in partly filling a die with finely divided depolarizing material, then applying a continuous surface layer of powdered metallic conductive material which is more electro-positive than copper to the exposed surface of the depolarizing material, completing the filling of the die with the depolarizing material, and then compressing or molding the material in the die, substantially as described.

12. The method of forming an electrode for a galvanic battery, which consists in perforating a sheet of conducting material, disposing finely divided depolarizing material on each side of said sheet in a die, and then compressing or molding the material in the die, substantially as described.

13. The method of forming an electrode for a galvanic battery, which consists in mixing a finely divided depolarizing material and an electrolyte, disposing a mass of the mixture so produced on each side of a layer of conducting material more electro-positive than said depolarizing material in a die, and then compressing or molding the same in the die, substantially as described.

14. The method of forming an electrode for a galvanic battery, which consists in incorporating oxid of copper, a solution of an electrolyte, and a layer of conducting material more electro-positive than copper in a molded element so that the layer of conducting material is disposed within the element, and then drying such element, substantially as described.

15. A negative electrode for a galvanic battery, comprising a layer of conducting material and a strong coherent compressed mass consisting of finely divided oxid of copper combined with a material which is more electro-positive than copper, and an electrolyte as a binder therefor disposed on each side of such layer, substantially as described.

16. A negative electrode for a galvanic battery, comprising a layer of conducting material and a strong coherent compressed mass consisting of finely divided oxid of copper combined with zinc, and an electrolyte as a binder therefor disposed on each side of such layer, substantially as described.

17. The method of forming an electrode for a galvanic battery, which consists in mixing a finely divided depolarizing material, a material which is more electro-positive than copper, and an electrolyte, disposing a mass of the mixture so produced on each side of a layer of conducting material in a die, and then compressing or molding the same in the die, substantially as described.

18. The method of forming an electrode for a galvanic battery, which consists in incorporating oxid of copper, a material which is more electro-positive than copper, a solution of an electrolyte, and a layer of conducting material in a molded element so that the layer of conducting material is disposed within the element, and then drying such element, substantially as described.

19. An oxid of copper plate for a galvanic battery having a layer of metallic material which is more electro-positive than copper disposed therein intermediate its outer surfaces, substantially as described.

20. An oxid of copper plate for a galvanic battery having a layer of powdered metallic zinc disposed therein intermediate its outer surfaces, substantially as described.

This specification signed this 5th day of April, 1919.

HAROLD N. COX.